United States Patent [19]

Bitterli et al.

[11] Patent Number: 4,866,113
[45] Date of Patent: Sep. 12, 1989

[54] COMPOUNDS USEFUL AS PIGMENTS CONTAINING ONE OR MORE 2,2,6,6-TETRAALKYLPIPERIDINE GROUPS

[75] Inventors: Peter Bitterli, Reinach, Switzerland; Manfred Geisel, Lörrach, Fed. Rep. of Germany; Jürgen Goldmann, Münchenstein, Switzerland; Bansi L. Kaul, Biel-Benken, Switzerland

[73] Assignee: Sandoz Ltd., Basel, Switzerland

[21] Appl. No.: 183,117

[22] Filed: Apr. 19, 1988

Related U.S. Application Data

[63] Continuation-in-part of Ser. No. 35,954, Apr. 8, 1987, Pat. No. 4,838,943.

[30] Foreign Application Priority Data

| Apr. 10, 1986 | [DE] | Fed. Rep. of Germany | 3612148 |
|---|---|---|---|
| May 30, 1986 | [DE] | Fed. Rep. of Germany | 3618216 |
| Sep. 10, 1986 | [DE] | Fed. Rep. of Germany | 3630717 |
| Sep. 20, 1986 | [DE] | Fed. Rep. of Germany | 3632039 |
| Nov. 13, 1986 | [DE] | Fed. Rep. of Germany | 3638763 |

[51] Int. Cl.$^4$ ............................................. C08J 3/10
[52] U.S. Cl. ............................ 524/87; 106/493; 524/103; 546/186
[58] Field of Search .......... 106/493; 524/103, 87, 524/92; 546/186

[56] References Cited

U.S. PATENT DOCUMENTS

| 4,259,488 | 3/1981 | Von der Crone | 524/87 |
| 4,260,540 | 4/1981 | Rolf et al. | 524/87 |
| 4,325,862 | 4/1982 | Schuster | 524/87 |
| 4,439,565 | 3/1984 | Winter et al. | 524/103 |
| 4,628,093 | 12/1986 | Neeff et al. | 524/103 |
| 4,695,600 | 9/1987 | Avar | 524/103 |

*Primary Examiner*—Paul Lieberman
*Assistant Examiner*—Willie J. Thompson
*Attorney, Agent, or Firm*—Gerald D. Sharkin; Richard E. Vila; Thomas C. Doyle

[57] ABSTRACT

A pigment, which retains a crystal or particulate structure throughout a process of coloration of a substrate, containing one or more 2,2,6,6-tetraalkylpiperidine groups.

34 Claims, No Drawings

COMPOUNDS USEFUL AS PIGMENTS CONTAINING ONE OR MORE 2,2,6,6-TETRAALKYLPIPERIDINE GROUPS

This application is a continuation-in-part of copending application Ser. No. 035,954, filed Apr. 8, 1987 now U.S. Pat. No. 4,838,943.

According to the invention there is provided a pigment, which retains a crystal or particulate structure throughout a process of colouration of a substrate, containing one or more 2,2,6,6-tetraalkylpiperidine groups.

For the avoidance of doubt, pigments are distinct from dyes. The Dry Colour Manufacturers Association (DCMA) have given a definition of pigments that differentiates them from dyes as follows.

Pigments are defined as "coloured, black, white or fluorescent particulate organic or inorganic solids, which are usually insoluble in and essentially physically and chemically unaffected by the vehicle or substrate in which they are incorporated. They alter appearance by selective absorption and/or by scattering of light. Pigments are usually dispersed in vehicles or substrates for application as, for instance, in the manufacture of inks, paints, plastics or other polymeric materials. Pigments retain a crystal or particulate structure throughout the colouration process."

Dyes have been defined, by the Dyes Environmental and Toxicity Organisation (DETO) as "intensely coloured or fluorescent organic substances only, which impart colour to a substrate by selective absorption of light. Dyes are . . . soluble and/or go through a process which, at least temporarily, destroys any crystal structure of the colour substances. Dyes are retained in the substrate by absorption, solution and mechanical retention or by ionic or covalent chemical bonds." (Abstracted from an article appearing in American Ink Maker, June, 1982).

Preferred pigments according to the invention are those of formula I or II

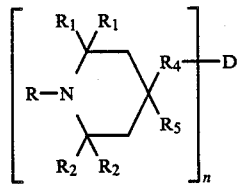

(I)

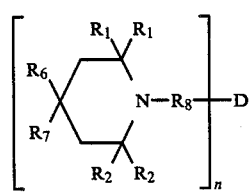

(II)

in which R is hydrogen, $C_{1-8}$alkyl, $C_{3-10}$alkenyl, phenyl, phenyl-$C_{1-4}$alkyl or —$COR_{5a}$ where $R_{5a}$ is hydrogen, —$C(R_{10a})$=$CH_2$, $C_{1-6}$alkyl, phenyl, —$COOC_{1-4}$alkyl or —$NR_{21}R_{22}$, where $R_{10a}$ is hydrogen or $C_{1-4}$alkyl; $R_{21}$ is hydrogen, $C_{1-12}$alkyl, $C_{5-6}$cycloalkyl, phenyl, phenyl$C_{1-4}$alkyl or $C_{1-12}$alkylphenyl and $R_{22}$ is $C_{1-12}$alkyl or hydrogen;

each $R_1$ independently is —$CH_3$ or —$CH_2(C_{1-4}$alkyl) or both groups $R_1$ form a group —$(CH_2)_5$—;

each $R_2$ independently is —$CH_3$ or —$CH_2(C_{1-4}$alkyl) or both groups $R_2$ form a group —$(CH_2)_5$—;

$R_4$ is a direct bond or a bridging group; and $R_5$ is hydrogen or $C_{1-4}$alkyl; or $R_4$ and $R_5$ together with the carbon atom to which they are attached form an isocyclic or heterocyclic bridging group;

$R_6$ is —$NH_2$, mono or di-$C_{1-4}$alkylamino, $C_{1-2}$alkylcarbonylamino, benzoylamino, hydrogen, OH or —CO—$C_{1-4}$alkyl or —CO—$C_{1-4}$alkoxy; and $R_7$ is hydrogen or $C_{1-4}$alkyl or $R_6$ and $R_7$ together with the carbon atom to which they are attached form an isocyclic or heterocyclic ring;

$R_8$ is a direct bond or a bridging group;

D is a residue of a pigment; and n is an integer from 1 to 4 inclusive.

For the avoidance of doubt, where a symbol appears more than once in a formula, its significances are independent of one another, unless indicated to the contrary.

When $R_4$ and $R_5$ together with the carbon atom to which they are attached form a heterocyclic or isocyclic ring, this ring is preferably a group of formula (a) or (b)

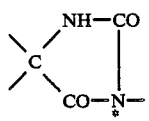

(a)

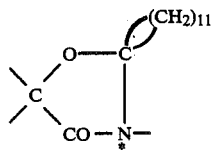

(b)

the starred atom being attached to D.

When $R_4$ is a bridging group this is preferably
*—NHCO—, *—NHSO$_2$—, *—NH—CO—O—, *—NH—COCH$_2$O—, *—NHCOCO—, —NH-COCONH—, *—NHCOCOO—, *—OCO—, *—OSO$_2$—, *—OCOCO—, *—OCOCOO—, —OCO—CO—O—, *—OCONH— or *—OCOCONH—, where the starred atom is attached to the piperidine ring.

When $R_8$ is a bridging group, this is preferably —CO—, —CH$_2$*CO—, —OCH$_2$*CO— or —SO$_2$—, where the starred atom is attached to the piperidine ring.

When $R_6$ and $R_7$ together with the carbon atom to which they are attached form a heterocyclic or isocyclic ring, this ring is preferably a group of formula (c) or (d)

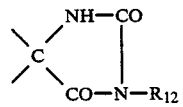

(c)

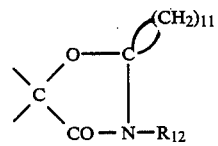

(d)

where $R_{12}$ is hydrogen, $C_{1-4}$alkyl or $C_{1-4}$alkoxycarbonyl-$C_{1-3}$alkyl.

Preferably D is pigment residue of the azo, perinone, perilene, quinophthalone, isoindolinone, dioxazine, acetoacetyl amine, phthalocyanine or pyrrolo-pyrrole series.

When D is a pigment of the azo series, $R_4$ or $R_8$ of the compound of formula I or II respectively, may be attached either to the diazo component or to the coupling component. Preferably when D is a pigment residue of the azo series, it is a monoazo or disazo pigment residue.

More preferably D is D' where D' is a group of formula III to VIII when monovalent

   (III)

   (IV)

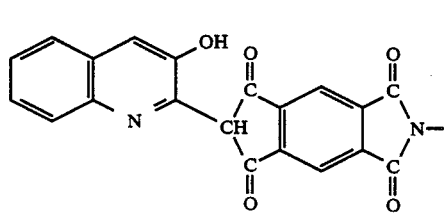   (V)

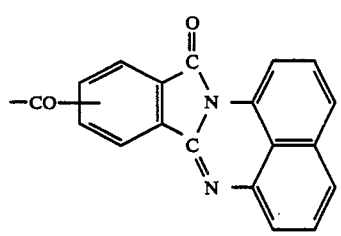   (VI)

CuPc—   (VII)

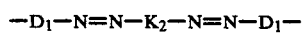   (VIII)

or D' is a group of formula IX to XV, when divalent

   (IX)

—$K_1$—N=N—$D_3$—N=N—$K_1$—   (X)

—CuPc—   (XI)

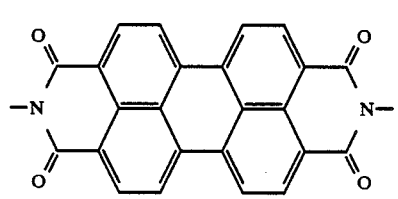   (XII)

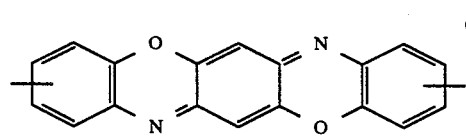   (XIII)

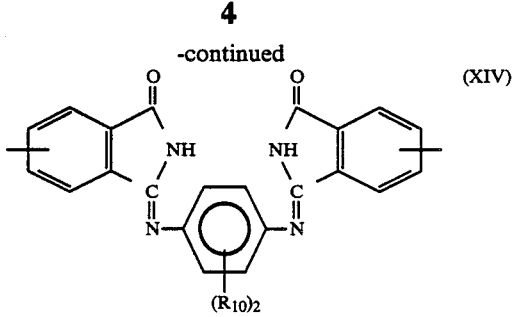   (XIV)

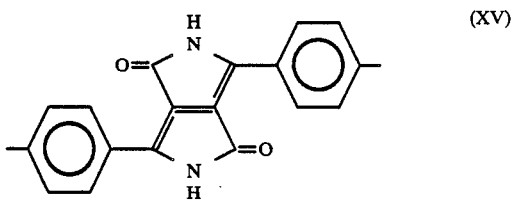   (XV)

or D' is a group of the formula XVI, when trivalent

   (XVI)

or D' is a group of the formula XVII, when tetravalent

   (XVII)

in which $D_1$ is 1,3- or 1,4-phenylene, unsubstituted or mono or di-substituted by substituents selected from the group consisting of chloro, bromo, $C_{1-2}$alkyl, $C_{1-2}$alkoxy, carboxy or $C_{1-4}$alkoxycarbonyl; or 1,4, -1,5- or 1,8-anthraquinone, unsubstituted or mono or disubstituted by substituents selected from the group consisting of chloro, bromo, hydroxy, $C_{1-3}$alkoxy or acylamino;

$D_2$ is phenyl, unsubstituted or substituted by one to three substituents, selected by the group consisting of chloro (max. 2), bromo (max. 2), $C_{1-2}$alkoxy (max 2), $C_{1-4}$alkoxy carbonyl (max 2) and acylamino (max 1);

$D_3$ is a 4,4'-diphenylene group, unsubstituted or substituted by one to four substituents selected from chloro, bromo, $C_{1-2}$alkyl and $C_{1-2}$alkoxy or is a group of formula

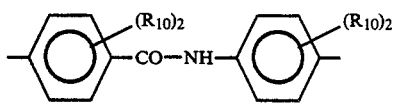

K— is

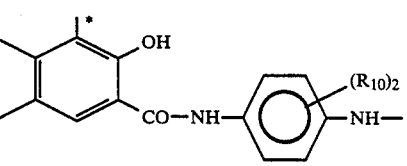

-continued
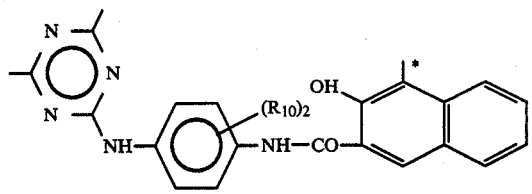
where the starred atoms are attached to the azo in a group of formula VIII
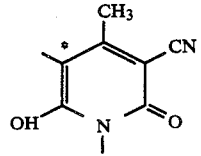
where the starred atom is attached to the azo group of IV or X; and $R_{16}$ is —O— or —NH—;
$K_2$ is a group of any one of formula $K_{2a}$ to $K_{2c}$
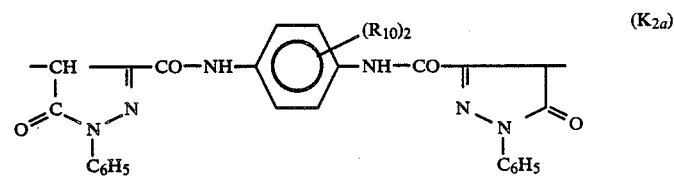 (K$_{2a}$)
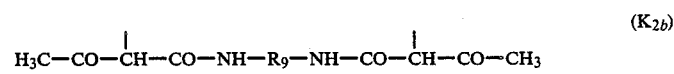 (K$_{2b}$)
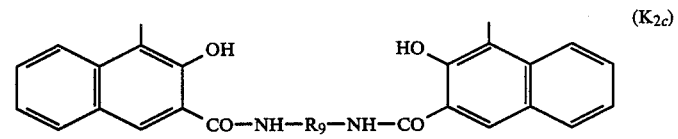 (K$_{2c}$)
$K_1$ is a group of any one of formula $K_{1a}$ to $K_{1f}$
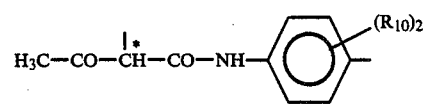 (K$_{1a}$)
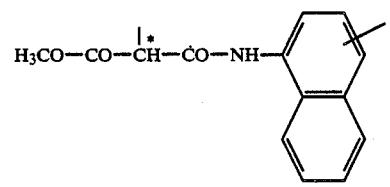 (K$_{1b}$)
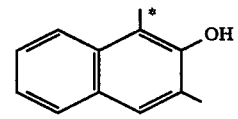 (K$_{1c}$)
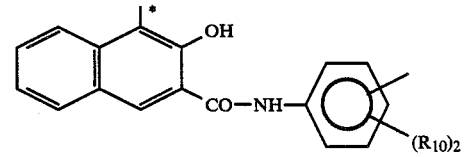 (K$_{1d}$)
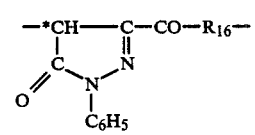 (K$_{1e}$)
$K_3$ is a group of any one of formula $K_{3a}$ to $K_{3g}$
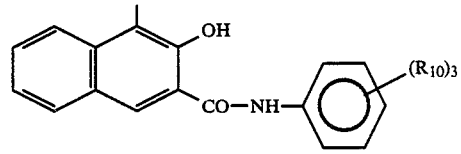 (K$_{3a}$)
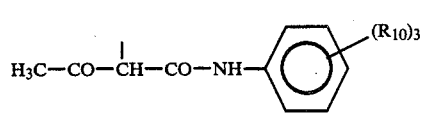 (K$_{3b}$)
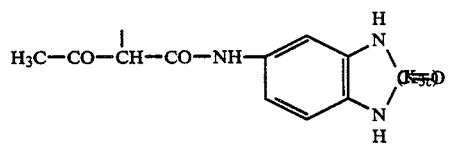 (K$_{3c}$)
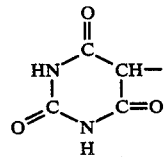 (K$_{3d}$)
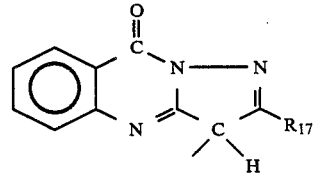 (K$_{3e}$)

-continued

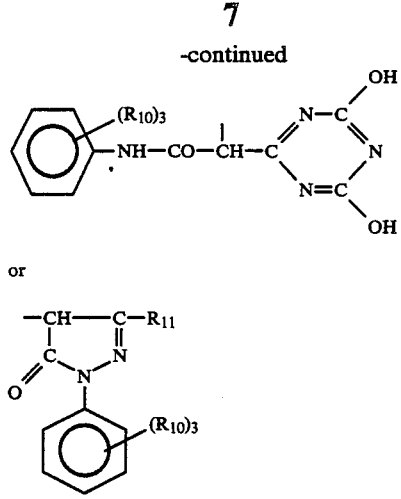

or

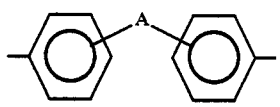

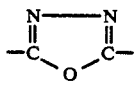

in which $R_{10}$ is hydrogen, chloro, bromo, $C_{1-3}$alkoxycarbonyl, $C_{1-2}$alkyl, $C_{1-2}$alkoxy or nitro;

$R_g$ is 1,4-phenylene, unsubstituted or substituted by one or two groups selected from chloro, bromo, methyl or $C_{1-2}$alkoxy; -4,4'-diphenylene; 1,4- or 1,5-naphthylene or a group of the formula

—⟨◯⟩—A—⟨◯⟩— where A is —CH₂—, —NHCO—, —NHCONH—, —NH—CO—CO—NH— or $$\underset{O}{-C\overset{N\text{---}N}{\underset{}{\|\ \ \ \|}}C-}$$

$R_{11}$ is methyl, —COOH or —COOC$_{1-4}$alkyl; and $R_{17}$ is —OH, methyl or unsubstituted phenyl.

By the term "acyl" is preferably meant formyl, —COC$_{1-4}$alkyl, —COC$_{1-4}$alkoxy, or —CO—COO—C$_{1-4}$alkyl. When $D_1$ or $D_2$ is substituted by acylamino, it is preferably —COC$_{1-4}$-alkyl or —COC$_{1-4}$alkoxy.

Preferably each $R_1$ and each $R_2$ is —CH$_3$.

Preferably R is R' where R' is hydrogen, methyl, formyl, $C_{1-4}$alkylcarbonyl or —CO—CO—OC$_{1-4}$alkyl.

Preferably $R_4$ is $R_4'$ and $R_5$ is $R_5'$ where $R_4'$ is a direct bond, —NH—CO— or —NH—CO—CH$_2$—O— and $R_5'$ is hydrogen; or $R_4'$ and $R_5'$ together with the carbon atom to which they are attached form a group of formula (a) or (b) defined above.

Preferably $R_6$ is $R_6'$ and $R_7$ is $R_7'$ where $R_6'$ is —NH$_2$, mono— or di—C$_{1-4}$alkylamino, C$_{1-2}$alkylcarbonylamino or benzoylamino and $R_7'$ is hydrogen; or $R_6'$ and $R_7'$ together with the carbon atom to which they are attached form a group of formula (c) or (d) defined above.

$R_8$ is preferably $R_8'$ where $R_8'$ is a direct bond or —CO—, —CH$_2$CO—, —OCH$_2$CO— or —SO$_2$—.

Preferably $R_{10}$ is $R_{10}'$ where $R_{10}'$ is hydrogen, methyl, chloro, bromo, $C_{1-2}$alkoxy (max. 1 on a phenyl ring), or $C_{1-3}$alkoxycarbonyl (max. 1 on a phenyl ring).

More preferably $R_{10}$ is $R_{10}''$ where $R_{10}''$ is hydrogen, methyl, chloro, bromo or methoxy (max. 1 on a phenyl ring).

Preferred compounds of formula I are of formula XX

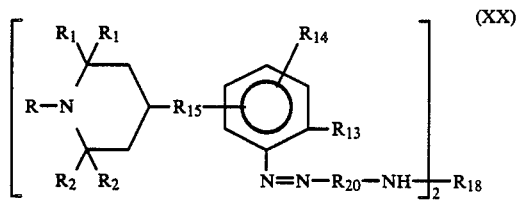

in which R, $R_1$ and $R_2$ are as defined above;
either both groups $R_{20}$ are of formula (e) or both groups $R_{20}$ are of formula (f)

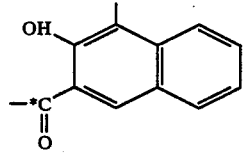

where the starred atom is attached to the —NH group;

$R_{13}$ is hydrogen, chloro, bromo, methyl, ethyl, $C_{1-2}$alkoxy or $C_{1-4}$alkoxycarbonyl;

$R_{14}$ is hydrogen, chloro, bromo or methyl;

$R_{15}$ is —CO—NH*—, —CO—O*— or —SO$_2$NH*—; the starred group being attached to the 2,2,6,6-tetraalkyl-piperidine group;

$R_{18}$ is 1,4-phenylene, unsubstituted or substituted by 1 or 2 groups selected from chloro, bromo, methyl, ethyl, methoxy and ethoxy; 4,4'-diphenylene, each phenylene group being unsubstituted or substituted by 1 or 2 groups selected from chloro, bromo, methyl, ethyl, methoxy and ethoxy; or unsubstituted 1,4- or 1,5-naphthalene.

Preferably, when $R_{14}$ is other than hydrogen it is para to $R_{13}$.

Preferably, $R_{15}$ is attached to the phenyl ring para to $R_{13}$ when $R_{14}$ is hydrogen and para to the azo moiety when $R_{14}$ is other than hydrogen.

Preferably, $R_{13}$ is chloro, methoxy or $C_{1-2}$alkoxycarbonyl, more preferably chloro.

Preferably, $R_{14}$ is hydrogen or chloro.

Preferably, $R_{15}$ is —CO—NH— or —SO$_2$NH—.

Compounds of formula I or II can be prepared by reacting 1 mol of a compound of formula XXV

D—R$_{30}$       (XXV)

with n moles of a compound of formula XXVI or XXVII

Compounds of formula I or II can be prepared by reacting 1 mol of a compound of formula XXV

, D—R$_{30}$       (XXV)

with n moles of a compound of formula XXVI or XXVII

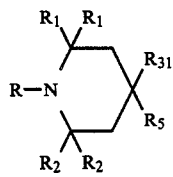
(XXVI)

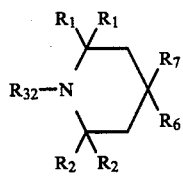
(XXVII)

where one of $R_{30}$ and $R_{31}$ is —COCl or Cl and the other is —$R_4$—H or one of $R_{30}$ and $R_{31}$ is —$R_4$—Cl and the other is hydrogen; and one of $R_{30}$ and $R_{32}$ is —COCl or Cl and the other is —$R_8$—H or one of $R_{30}$ and $R_{31}$ is —$R_8$—Cl and the other is hydrogen and the other symbols are as defined above.

Preferably where D is of the azo series, the above reaction is carried out at elevated temperatures, more preferably 80° to 150° C. Preferably where D is of the azo series the reaction is carried out in the presence of an inert solvent such as $C_{1-4}$alkylbenzene, halobenzene or a high boiling liquid hydrocarbon.

Preferably where D is of the quinophthalone series, the above reaction is carried out at lower temperatures, more preferably 10°–40° C., most preferably room temperature (about 25°).

Preferably where D is of the perylene or perinone series, the reaction is carried out at elevated temperatures, preferably from 100° to 240° C.

Preferably where D is of the acetoacetylamine series the above reaction is carried out at temperatures from 20° to 100° C.

Preferably where D is of the isoindolinone dioxazine, phthalocyanine or pyrrolo-pyrrole series, the reaction is carried out at a temperature of 20° to 100° C.

Further, according to the invention there is provided a compound, for use in preparing a compound of formula I or formula II where D is of the azo series, of formula XXX or XXXI

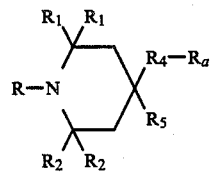
(XXX)

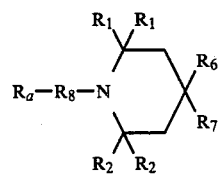
(XXXI)

where $R_a$ is the residue of a diazotisable amine or of a coupling component and the other symbols are as defined above. Preferably $R_a$ is naphthyl or phenyl unsubstituted or substituted by 1 or 2 groups selected from Cl, Br, OH, $NH_2$, $C_{1-4}$alkoxy, $C_{1-4}$alkyl or $C_{1-3}$alkoxycarbonyl.

The compounds according to the invention are suitable for pigmenting polymeric material such as polyethylene, polypropylene, polystyrene, polyvinylchloride, natural rubber and synthetic leather. The compounds according to the invention are also suitable for use in lacquers of various types, for example oil or water based paints. The compounds according to the invention are also suitable for pigmenting in the mass (either in solvent containing or solvent free systems) for example spin dyeing of viscose or cellulose acetate. The compounds according to the invention are also suitable for printing inks, for pigmenting paper and for applying to coatings of textiles.

The resulting pigmentations have excellent fastness properties to heat, light, weathering, chemicals, migration, bleeding, overlacquering and solvents. Further, the compounds according to the invention maintain their depth of colour and have good application properties, for example resistance to flocculation, resistance to crystallisation and fastness to dispersing.

Polymers to which pigments of the invention are applied are also stabilised against the effects of U.V. light by the pigments. The tensile strength of polymer containing a pigment according to the invention is significantly improved over that of virgin polymer.

The invention will now be illustrated by the following Examples in which all parts and percentages are by weight and all temperatures are in °C. unless indicated to the contrary.

EXAMPLE 1

61.9 Parts of 3-amino-4-chloro-benzoic acid-2′,2′,6′,6′-tetramethyl-piperidinylamide are stirred for 1 hour in 100 parts of water and 105 parts of glacial acetic acid at room temperature. This is then reacted with 75 parts of conc. HCl and stirred a further hour. The mixture is then cooled to 0°–5° by adding 100 parts of ice and immersing the reaction vessel in an ice/water bath. 51 parts by volume of 4N aqueous sodium nitrite solution is added slowly over 15–20 minutes and the mixture is stirred for a further hour, whilst maintaining the temperature below 5°. The resulting diazonium chloride solution is then clear filtered.

25.6 Parts of barbituric acid are dissolved in 100 parts of water and 20 parts by volume of a 30% aqueous NaOH solution which is then precipitated out again in a mixture of 100 parts of water and 21 parts of glacial acetic acid. The suspension is cooled to 0° to 5° and, whilst stirring is added over 25 minutes to the diazonium solution which is also at that temperature. The resultant yellow suspension is stirred for 3 hours whilst further cooling, then for one hour at room temperature and then for a further hour at 80°–85°, filtered and the precipitate is washed with salt and acid-free water, dried at 80° and milled. A pigment of the formula 1a

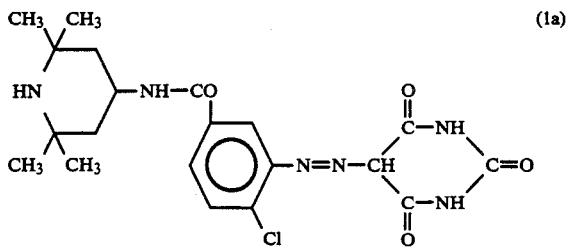

results that colours polypropylene a yellow tone and the resulting pigmentations have good fastness properties. The coloured polypropylene can also be worked into fibres having good tensile strength.

EXAMPLE 2

25.3 Parts of 4,4'-diamino-3,3'-dichloro-1,1'diphenyl are stirred for 1 hour in 60 parts of water and 60 parts of concentrated HCl at room temperature and this is then cooled to 0° to 5° by adding 100 parts of ice and immersing the reaction vessel in an ice cold bath. The solution that forms is added, whilst stirring, to 51 parts by volume of 4N aqueous sodium nitrite over 15–20 minutes and this is stirred for a further hour at 0° to 5°. The resulting diazonium solution is then clear filtered.

57.8 Parts of 1-(2',2',6',6'-tetramethylpiperidinyl)-2-hydroxy-4-methyl-5-cyanopyrid-6-one, are dissolved in 200 parts by volume water and 25 parts by volume of a 30% solution of aqueous NaOH and by the slow addition of a mixture of 100 parts of ice, 100 parts by volume of water and 25 parts by volume of glacial acetic acid, the pyridone product precipitates out again. The suspension that results is then slowly added, over 20–30 minutes at 0° to 5° whilst stirring, to the above-mentioned diazonium solution.

The resulting red suspension is of the pigment of formula 2a

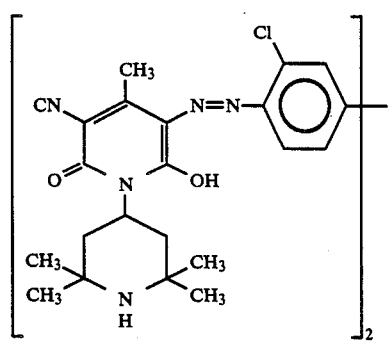

The suspension is stirred for a further 3 hours at 0° to 5° and for a further hour at 80° to 85°. The suspension is then filtered, the precipitate is washed with salt and acid-free water and is then dried under vacuum at 80°.

83.6 Parts of the pigment of formula 2a results, that colours polypropylene a red tone and the resulting pigmentations have good fastness properties. The polymer can be worked into fibres having good tensile strength.

EXAMPLE 3

1.2 Parts of sodium metal are dissolved in 80 parts of methanol. The solution is cooled to 20° C. and 12.8 parts of phthalodinitrile are added. The suspension that results is stirred for 1½ hours at 20° to 25°. 23.5 parts of 4-cyanoacetylamino-2,2,5,6-tetramethyl piperidine are added and the mixture is stirred at room temperature for 16 hours. 3 parts glacial acetic acid are added and a golden yellow intermediate product precipitates out which is washed with methanol and water and then dried under vacuum at 60°.

17.5 Parts of the so formed intermediate product are stirred into 100 parts of dimethylformamide and are then reacted with 6.4 parts of barbituric acid. A yellow pigment is formed very quickly. After stirring for 16 hours at 20°–25°, the mixture is heated for a further hour to 80° and then is reacted with 3 parts of glacial acetic acid. The resulting pigment is of formula 3a

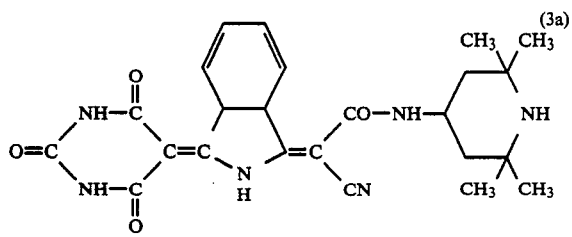

and at 20° can be filtered off, washed with dimethylformamide and cold water and dried.

After milling, the pigment can be added to plastics materials and to lacquers to colour them yellow and produce pigmentations having good fastness properties.

EXAMPLE 4

4.8 Parts of zinc acetate dihydrate, 6.5 parts of perilene-3,4,9,10-tetracarboxylic acid dianhydride and 14.3 parts of 3-aminobenzene sulphonic acid-2',2',6',6'-tetramethylpiperidinylamide are heated to 220° in 120 parts of quinoline under a weak nitrogen atmosphere and left at this temperature for 5 hours. After this time, a sample, boiled in dilute NaOH solution, shows no free perilene tetracarboxylic acid present.

After cooling to 100°, the mixture is filtered and the residue is washed in quinoline, methanol and water. The resulting damp presscake is heated to 95° in 100 parts of 2% aqueous sodium hydroxide, after which it is filtered off and then washed, dried and milled. 9 Parts of the pigment of formula 4a

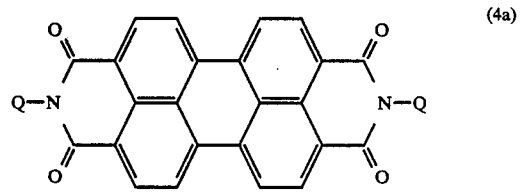

where Q is

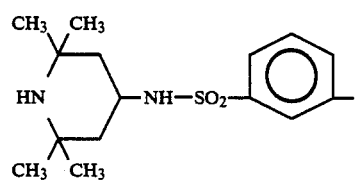

result, which pigment is a red bordeaux colour and has good properties in plastics material.

EXAMPLE 5

65.4 Parts of pyromellitic acid dianhydride and 61 parts of 3-hydroxy-2-methyl-quinoline-4-carboxylic acid are heated under reflux at 205° in 1000 parts of nitrobenzene for 1 hour, distilling off the water produced by the reaction. The mixture is held at this temperature for 3½ hours. The mixture is then cooled to 10° and after stirring at this temperature for 1 hour, is filtered and the product is washed in toluene and ethanol. 93 parts of a dark brown quinophthalone intermediate result.

90 Parts of this quinophthalone intermediate are stirred homogenously with 900 parts of 1-methyl-2-pyrrolidinone for 1 hour. When the mixture is at about 25°, 42 parts of 4-amino-2,2,6,6-tetramethyl-piperidine are added. The temperature rises to about 35°. After the exothermic reaction has terminated, the mixture is heated to 120° over 1 hour and held for 2 hours at this temperature. The mixture is then refluxed for 15 hours, distilling off the water produced by the reaction, after which it is cooled to room temperature, filtered, washed with a little 1-methyl-2-pyrrolidinone and alcohol and then dried. 81 parts of a bronze pigment of formula 5a (5a)

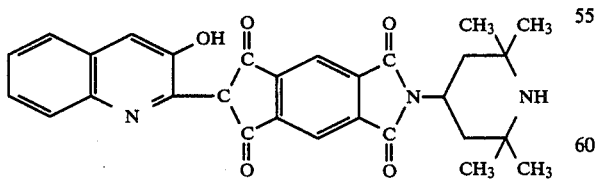

result, that can be used to colour polypropylene brown and such pigmentations have good fastness properties.

EXAMPLE 6

33.45 Parts of a product derived from the coupling of 2 mols of diazotised 3-amino-4-chlorobenzoic acid and 1 mol of 1,4-bis-acetoacetylamino-2,5-dimethylbenzene are stirred in 300 parts by volume of ortho-dichlorobenzene and 1 part by volume of dimethylformamide. This is then heated to 100° and slowly reacted with 10 parts of thionyl chloride and is then stirred for 2 hours at 100° whereby the suspension thickens. Any excess of thionyl chloride, together with about 20 parts by volume of ortho-dichlorobenzene is distilled off at 70°–80° under vacuum (20–30 mm of Hg). To the remaining mixture, a solution of 15.5 parts of 4-amino-2,2,6,6-tetramethyl-piperidine in 80 parts by volume of ortho-dichlorobenzene is added and the mixture is stirred for 2 hours at 120°, followed by a further 2 hours at 150°, after which the suspension is cooled to 80°–100°. The resulting reddish yellow suspension is then filtered, washed with orthochlorobenzene (at 80°–100°) until the filtrate is colourless. After cooling, the orth-dichlorobenzene is separated from the filtrate by the addition of methanol, and this is then washed out of the methanol with water and the resulting pigment is dried.

The resulting pigment is of formula 6a

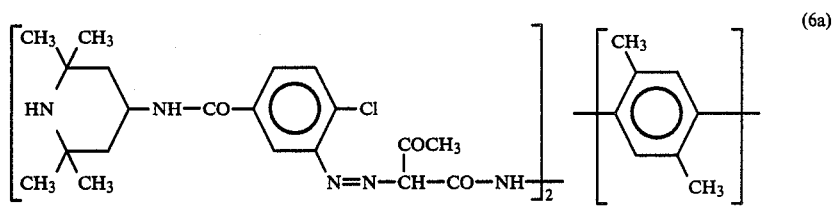

(6a)

and colours polypropylene a reddish-yellow tone.

EXAMPLE 7

Example 1 is repeated using, instead of 25.6 parts of barbituric acid, 29.0 parts of 1,4-bis-acetoacetylamino-2-methylbenzene to form the pigment of formula 7a

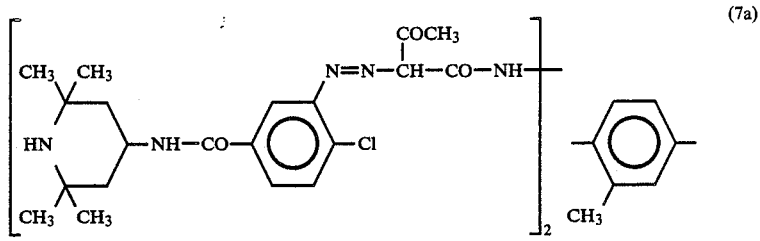

(7a)

The pigment of formula 7a colours polypropylene a yellow tone and produces pigmentations with good fastness properties.

EXAMPLE 8

Example 7 is repeated using (instead of 61.9 parts of 3-amino-4-chlorobenzoic acid-2',2',6',6'-tetramethyl-piperidinylamide) 76.0 parts of 4-amino-2,5-dichloro-benzene sulphonic acid-2',2',6',6'-tetramethyl piperidinylamide. The resulting pigment is of formula 8a

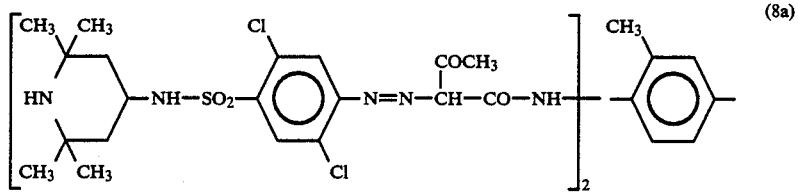 (8a)

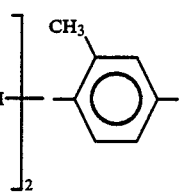

which colours polypropylene a yellow tone and produces pigmentations with good fastness properties. The polypropylene can also be worked into fibres that have a good tensile strength.

EXAMPLE 9

(i) 38.0 Parts of 4-amino-2,5-dichlorobenzene sulphonic acid-2',2',-6',6'-tetramethylpiperidinylamide in 50 parts of water and 50 parts of glacial acetic acid are diazotised according to the method of Example 1.

To this product 18.8 parts of 2-hydroxy-3-naphthalene carboxylic acid in 10 parts by volume of water and 15 parts by volume of a 30% aqueous NaOH solution are added and coupled according to the method of Example 1. The compound of formula 9a

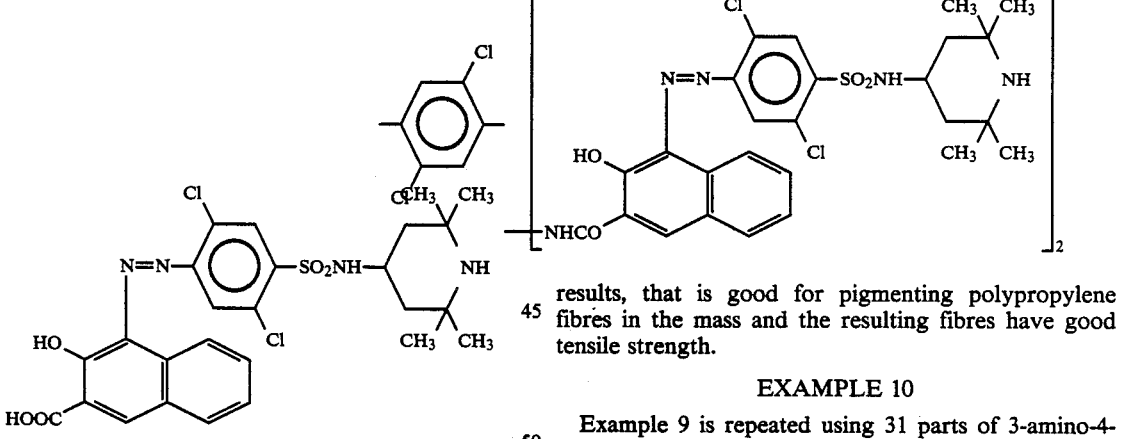

(9a)

results.

(ii) 57.9 Parts of the compound of formula 9a are then stirred into 300 parts by volume of 1,2-dichlorobenzene. In order to remove resultant water, the mixture is distilled at 70°-80° under vacuum and about 30 parts by volume of 1,2-dichlorobenzene and water are removed. The mixture is then cooled to 60° and 1 part by volume dimethyl formamide and 10.2 parts by volume of thionyl chloride are added and are stirred for 3 hours at 100°-110°, whereby $SO_2$ and HCl are given off in forming the resulting acid chloride of the pigment of formula 9a.

Then the excess thionyl chloride is distilled off at 70°-80° under vacuum together with 30 parts by volume 1,2-dichlorobenzene.

A solution of 8.9 parts of 1,4-diamino-2,5-dichlorobenzene(the condensation amine) dissolved in 150 parts by volume of 1,2-dichlorobenzene at 100° is added to the acid chloride suspension. The resulting red pigment suspension is stirred for 2 hours at 120° and then for a further 2 hours at 150°. It is then filtered at 100°, washed with 400 parts by volume of 1,2-dichlorobenzene at 100°, cooled to room temperature and then washed with 500 parts by volume of methanol and 500 parts by volume of water. The filter cake is dried and then milled. 59.8 parts of a red pigment of formula 9b

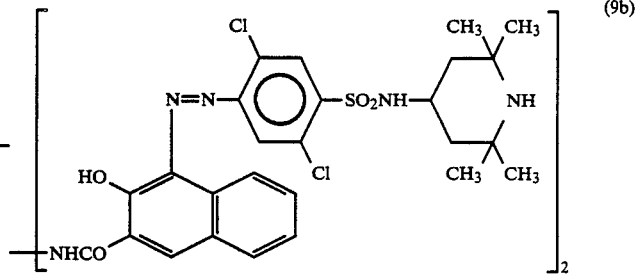

(9b)

results, that is good for pigmenting polypropylene fibres in the mass and the resulting fibres have good tensile strength.

EXAMPLE 10

Example 9 is repeated using 31 parts of 3-amino-4-chlorobenzoic acid-2',2',6',6'-tetramethyl piperidinylamide instead of 38 parts of 4-amino-2,5-dichlorobenzene sulphonic acid-2',2',6',6-tetramethylpiperidinylamide.

56.7 Parts of the pigment of the formula 10a

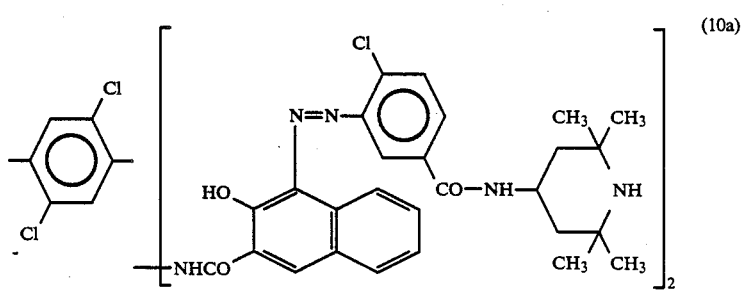

(10a)

result, that colours polypropylene red by pigmentation in the mass and produces fibres with good tensile strength.

(ii) The pigment of formula 10a can also be prepared by a method analogous with that of Example 1 using 31 parts of 3-amino-4-chlorobenzoic acid-2',2',6',6'-tetramethylpiperidinyl amide (instead of 61.9 parts of 3-amino-4-chlorobenzoic acid-2',2',6',6'-tetramethylpiperidinylamide) and 25.9 parts of 1,4-bis-(2'-hydroxy-3-naphthoylamino)-2,5-dichlorobenzene (instead of 25.6 parts of barbituric acid). Twice as much water is however used in the step of reacting the diazonium chloride solution with the coupling component and twice as much water is used when adding the glacial acetic acid.

(iii) The pigment of formula 10a can also be made by a method analogous with that of Example 9(ii) by coupling 2 moles of diazotised 3-amino-4-chlorobenzoic acid with 1 mol of 1,4-bis(2'-hydroxy-3'-naphthoylamino)-2,5-dichlorobenzene forming the acid chloride with thionyl chloride and condensing this acid chloride with 2,2,6,6-tetramethyl-4-aminopiperidine.

EXAMPLES 11 to 14

Compounds of the formula 4a

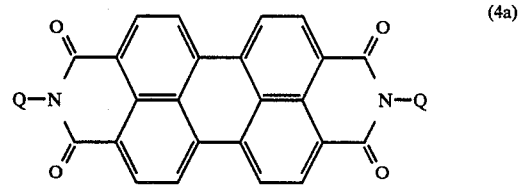

in which Q is as given in Table 1 below, can be formed by a method analogous to that of Example 4 from appropriate reactants.

TABLE 1

| Ex. No. | Q | Colour in Polypropylene |
|---|---|---|
| 11 | (2,2,6,6-tetramethylpiperidin-4-yl, NH) | Red |
| 12 | (4-(N-acetyl-2,2,6,6-tetramethylpiperidin-4-yl-aminocarbonyl)phenyl) | Red |
| 13 | (4-(2,2,6,6-tetramethylpiperidin-4-yl-aminocarbonyl)phenyl) | Red-brown |
| 14 | (4-(2,2,6,6-tetramethylpiperidin-4-ylamino)phenyl) | red-violet |

EXAMPLES 15 to 46

Compounds of the formula

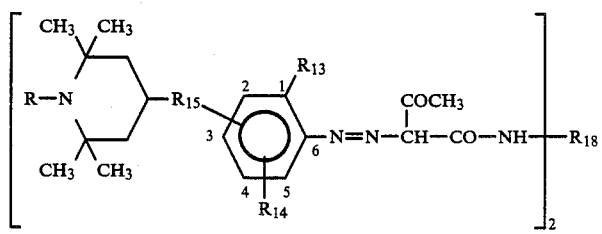

in which the symbols are as defined in Table 2 below can be prepared by a method analogous to that of Example 7 from appropriate reagents.

TABLE 2

| Ex. No. | R | $R_{13}$ | $R_{14}$ | $R_{18}$ | Colour in polypropylene | $R_{15}$ | pos. of $R_{15}$ |
|---|---|---|---|---|---|---|---|
| 15 | H | Cl | H | 1,4-phenylene | yellow | —CONH— | 4 |
| 16 | H | Cl | H | 2-chloro-1,4-phenylene | " | " | 4 |
| 17 | H | Cl | H | 2,5-dichloro-1,4-phenylene | " | " | 4 |
| 18 | H | Cl | H | 2-methoxy-1,4-phenylene | " | " | 4 |
| 19 | H | Cl | H | 2,5-dimethoxy-1,4-phenylene | reddish-yellow | " | 4 |
| 20 | H | Cl | H | 2-chloro-5-methyl-1,4-phenylene | yellow | " | 4 |
| 21 | H | Cl | H | 3,3'-dimethyl-4,4'-diphenylene | yellow | " | 4 |
| 22 | H | $CH_3$ | H | 2,5-dimethyl-1,4-phenylene | " | " | 4 |
| 23 | H | —$OCH_3$ | H | " | " | " | 4 |
| 24 | H | —$COOCH_3$ | H | 1,4-phenylene | " | " | 4 |
| 25 | H | " | H | 2,5-dimethyl-1,4-phenylene | " | " | 4 |
| 26 | H | " | H | 2-methyl-5-chloro-1,4-phenylene | " | " | 4 |
| 27 | H | —$COOC_2H_5$ | H | 2,5-dimethyl-1,4-phenylene | " | " | 4 |
| 28 | —$COCH_3$ | Cl | H | 1,4-phenylene | " | " | 4 |
| 29 | " | Cl | H | 2,5-dimethyl-1,4-phenylene | " | " | 4 |
| 30 | " | Cl | H | 2-chloro-5-methyl-1,4-phenylene | " | " | 4 |
| 31 | " | —$COOCH_3$ | H | 2,5-dimethyl-1,4-phenylene | " | " | 4 |
| 32 | " | " | H | 2-chloro-5-methyl-1,4-phenylene | " | " | 4 |
| 33 | " | " | H | 1,4-phenylene | " | " | 4 |
| 34 | H | Cl | H | 1,4-phenylene | reddish-yellow | —$SO_2NH$— | 4 |
| 35 | H | Cl | H | 2,5-dimethyl-1,4-phenylene | " | " | 4 |
| 36 | H | Cl | H | 2-chloro-5-methyl-1,4-phenylene | " | " | 4 |
| 37 | H | Cl | 4-Cl | | " | " | 3 |
| 38 | H | Cl | 4-Cl | 1,4-phenylene | " | " | 3 |
| 39 | H | Cl | 4-Cl | 2-chloro-1,4-phenylene | " | " | 3 |
| 40 | H | Cl | 4-Cl | 2,5-dichloro-1,4-phenylene | " | " | 3 |
| 41 | H | Cl | 4-Cl | 2-methoxy-1,4-phenylene | " | " | 3 |
| 42 | H | Cl | 4-Cl | 2,5-dimethoxy-1,4-phenylene | reddish-yellow | " | 3 |
| 43 | H | Cl | 4-Cl | 2,5-dimethyl-1,4-phenylene | yellow | " | 3 |
| 44 | H | Cl | 4-Cl | 3,3'-dimethyl-4,4'-diphenylene | " | " | 3 |
| 45 | H | Cl | 4-Cl | 1,5-naphthylene | " | " | 3 |
| 46 | H | Cl | 4-Cl | 1,4-naphthylene | " | " | 3 |

EXAMPLES 47 to 84

The pigments of Examples 47 to 75 defined in Table 3 can be prepared according to the method of Example 9 and the pigments of Examples 75 to 84 (defined in Table 4) can be made analogously to the method of Example 10 from appropriate reactants.

TABLE 3

| Ex. No. | Diazo Component | Coupling Component | Condensation amine | Colour in polypropylene |
|---|---|---|---|---|
| 47 | 3-amino-4-chloro-benzene sulfonic acid 2',2',6'-6'-tetramethylpiperidinyl-amide | 2-hydroxy-3-naphthene carboxylic acid | 1,4-diamino benzene | yellowish-red |
| 48 | " | " | 1,4-diamino-2-chlorobenzene | red |
| 49 | " | " | 1,4-diamino-2-chloro-5-methylbenzene | red |
| 50 | " | " | 1,4-diamino-2-methoxybenzene | reddish-brown |
| 51 | " | " | 3,3'-dichloro- | red |

TABLE 3-continued

| Ex. No. | Diazo Component | Coupling Component | Condensation amine | Colour in polypro- lene |
|---|---|---|---|---|
| 52 | " | " | benzidine 1,4-diamino-2,5-dichlorobenzene | " |
| 53 | 4-amino-2,5-dichloro-benzene sulfonic acid 2',2',6',6'-tetra-methylpiperidinylamide | " | 1,4-diamino benzene | yellowish-red |
| 54 | " | " | 1,4-diamino 2-chlorobenzene | blueish-red |
| 55 | " | " | 3,3'-dichloro-benzidine | red |
| 56 | " | " | 1,5-diamino-naphthalene | brown |
| 57 | " | " | 1,4-diamino-2-methyl-5-chloro-benzene | red |
| 58 | 4-amino-2,6-dichloro-benzene sulfonic acid-2',2',6',6'-tetra-methylpiperidinylamide | " | 1,4-diamino-benzene | " |
| 59 | 4-amino-2,6-dichloro-benzene sulfonic acid 2',2',6',6'-tetra-methylpiperidinylamide | 2-hydroxy-3-naphthene carboxylic acid | 1,4-diamino-2,5-dichlorobenzene | red |
| 60 | 4-amino-2,6-dichloro-benzene sulfonic acid 2',2',6,6'-tetramethyl-piperidinylamide | 2-hydroxy-3-naphthoic acid | 3,3'-dichloro-benzidine | red |
| 61 | " | " | 1,5-diamino-naphthalene | brown |
| 62 | 2-amino-4,5-dichloro-benzene sulfonic acid 2',2',6,6'-tetramethyl-piperidinylamide | " | 1,4-diamino benzene | red |
| 63 | " | " | 1,4-diamino-2,5-dichlorobenzene | " |
| 64 | " | " | 3,3'-dichloro-benzidine | " |
| 65 | " | " | 1,5-diamino-naphthalene | brown |
| 66 | 3-amino-4-chloro-benzoic acid-2',2',-6',6'-tetramethyl-piperidinylamide | " | 1,4-diamino-benzene | yellowish-red |
| 67 | ". | " | 1,4-diamino-2-chlorobenzene | red |
| 68 | " | " | 1,4-diamino-2-chloro-5-methyl benzene | red |
| 69 | " | " | 1,4-diamino-2-methoxybenzene | red-brown |
| 70 | " | " | 3,3'-dichloro-benzene | red |
| 71 | 3-amino-4-carbomethoxy benzoic acid 2',2',6'-6'-tetramethylpiperi-dinylamide | " | 1,4-diamino-benzene | yellowish-red |
| 72 | 3-amino-4-carboxymethoxy benzoic acid 2',2',6'-6'-tetramethylpiperi-dinylamide | 2-hydroxy-3-naphthene carboxylic acid | 1,4-diamino-2-chlorobenzene | blueish-red |
| 73 | " | " | 1,4-diamino-2,5-dichlorobenzene | red |
| 74 | " | " | 3,3'-dichloro-benzidine | red |
| 75 | " | " | 1,5-diamino-naphthalene | brown |

TABLE 4

| Ex. | Diazo Component | Coupling Component | Nuance |
|---|---|---|---|
| 76 | 3-amino-4-chlorobenzoic acid-2',2',6',6'-tetra-methylpiperidinylamide | 2-hydroxy-3-naphthoic acid-(4'-benzoylamino)-phenyl-amide | red |
| 77 | " | 5-(2'-hydroxy-3-naphthoyl amino)-benzimidazolone | brown |
| 78 | " | 5-acetoacetylaminobenzimida- | yellow |

TABLE 4-continued

| Ex. | Diazo Component | Coupling Component | Nuance |
|---|---|---|---|
| | | zolone | |
| 79 | 3-amino-4-methoxy-carbonylbenzoic acid 2',2',6',6'-tetra-methylpiperidinylamide | 2-hydroxy-3-naphthoic acid (4'-benzoylamino)-phenylamide | red |
| 80 | " | 5-(2'-hydroxy-3'-naphthoyl-amino)-benzimidazolone | brown |
| 81 | " | 5-acetoacetylamino-benzimi-dazolone | yellow |
| 82 | 4-aminobenzoic acid 2',2',6',6'-tetramethyl-piperidylamide | 2-hydroxy-3-napthoic acid-2'-methoxy-phenylamide | yellowish- |
| 83 | " | 2-hydroxy-3-naphthoic acid 2'-ethoxyphenylamide | scarlet |
| 84 | " | 2-hydroxy-3-naphthoic acid phenylamide | red |

EXAMPLE 85

(a) 3-aminobenzene sulphonic acid-2',2',6',6'-tetramethylpiperidinylamide (of Example 4) can be prepared by sulphochlorination and amidation of nitrobenzene with 4-amino-2,2,6,6-tetraalkylpiperidine followed by reduction with a sulphide (e.g. NaS). A white powder having a melting point of 244°–245° results.

(b) 4-(4'-chloro-3'-aminobenzoyl-)amino-2,2,6,6-tetramethylpiperidine can be prepared as follows.

A solution of 55.2 parts of 3-nitro-4-chlorobenzoyl chloride in 200 parts by volume of toluene is added dropwise to well stirred solution (at room temperature) of 100 parts by volume of toluene, 41 parts of 2,2,6,6-tetramethyl-4-aminopiperidine, 1 part of tetrabutyl ammonium bromide and 120 parts by volume of a 30% aqueous sodium hydroxide solution.

The mixture is stirred overnight and the resulting precipitate is filtered off. After washing with toluene and n-hexane, the filtrate is vacuum dried and in order to remove any organic salts present is added to 1000 parts of water. After a further filtration step and drying, 74 parts of 4-(4'-chloro-3'-nitrobenzoyl)amino 2,2,6,6-tetramethylpiperidine having a melting point of 166°–168° result.

In order to convert this to the amine, 68 parts of the nitro compound are added to a mixture of 600 parts by volume of 94% ethanol, 80 parts of iron powder and 16 parts of 30% HCl solution at boiling. After boiling for a number of hours, reduction is terminated. After adding 14 parts of sodium carbonate, the resulting iron oxide precipitate is filtered off. After concentrating by boiling under vacuum, 4-(3'-amino,4'-chlorobenzoyl)amino-2,2,6,6-tetramethylpiperidine results.

(c) 4-(3'-amino-4-chlorobenzoyl)amino-2,2,6,6-tetramethyl-1-acetylpiperidine can be prepared as follows:

68 Parts of 4-(3'-nitro-4'-chlorobenzoyl)-amino-2,2,6,6-tetramethylpiperidine are added to 250 parts of acetic anhydride. After the addition of 21 parts of triethylamine, the suspension is stirred for 16 hours at room temperature and then for 3 hours at 100°–110°. In order to complete precipitation of the acetyl derivative, 1500 parts by volume of cold water are added and stirred at room temperature until all the excess acetic anhydride is destroyed. The precipitate is then filtered, washed neutral with water and dried. 72 parts of 4-(3'-nitro-4'-chlorobenzoyl)-amino-1-acetyl-2,2,6,6-tetramethylpiperidine having a melting point of 198°–200° results.

Reduction may then be carried out as described under (b) above as for the N-unsubstituted tetraalkyl-piperidinyl compound with iron in an aqueous alcohol system.

A good yield of 4-(3'-amino-4'-chlorobenzoyl)amino-1-acetyl-2,2,6,6-tetramethylpiperidine having a melting point of 232°–234° result.

(d) 4-cyanoacetylamino-2,2,6,6-tetramethylpiperidine (in Example 3) can be produced by reacting 4-amino-2,2,6,6-tetramethylpiperidine with the ethyl ester of cyanoacetic acid in the absence of solvent at 90°.

APPLICATION EXAMPLE A 0.05 Parts of the compound of Example 1 are homogenised in a mixing roller mill at 150°–160° for about 8 minutes, with 2 parts of dibutyl-tin-bis-thioglycollic acid hexyl ester and 50 parts of a mixture consisting of 65% polyvinylchloride and 35% diethylhexylphthalate.

The polymer is rolled into a sheet and then is glossed in a double roller calender. The resultant transparent sheet has good light fastness properties.

APPLICATION EXAMPLE B

Four parts of the compound of Example 1 are added to 96 parts of a mixture of:
50 parts of a 60% solution of coco aldehyde-melamine resin of 32% of fat content in xylene,
30 parts of a 50% melamine resin solution in butanol,
10 parts of ethylene glycol monoethylether and
10 parts of xylene,
and the mixture ground for 24 hours in a ball mill. The dispersion obtained is sprayed on an aluminium sheet, the spray coating allowed to dry in the air for 30 minutes and then stoved for 30 minutes at 120°. A yellow film with good light and weathering fastness is obtained.

APPLICATION EXAMPLE C

The 990 parts of a commercially available U.V. stabilised polypropylene spin fibre type, 10 parts of the compound of formula 6a are added by a dry colouring method over 10 minutes, after which the polymer is extruded. Fibres that have a fibre of 15 d tex are obtained.

Tensile strength comparisons are then carried out on fibres that have been exposed for 200, 400, 600 and 800 hours (in a weatherometer). Fibres that have been exposed for 400 hours have a tensile strength of 57% of the value of unexposed fibres.

As a comparison polypropylene is coloured with the pigment of Example 2 of DAS 1,150,165 under the same conditions and after 400 hours the tensile strength of the fibres is only 20% of the value of the unexposed fibres.

Application Examples A to C can be repeated using an appropriate amount of an other compound of Examples 1 to 6 and 8 to 84.

What is claimed is:

1. A polymeric composition comprising a polymeric material pigmented with a pigment of formula I or II

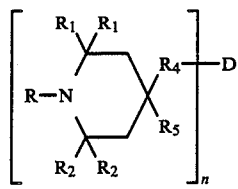   (I)

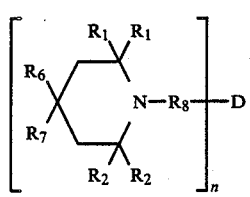   (II)

in which R is hydrogen, $C_{1-8}$alkyl, $C_{3-10}$alkenyl, phenyl, phenyl-$C_{1-4}$alkyl or —$COR_{5a}$ where $R_{5a}$ is hydrogen, —$C(R_{10a})$=$CH_2$, $C_{1-6}$alkyl, phenyl, —$COOC_{1-4}$alkyl or —$NR_{21}R_{22}$, where $R_{10a}$ is hydrogen or $C_{1-4}$alkyl; $R_{21}$ is hydrogen, $C_{1-12}$alkyl, $C_{5-6}$cycloalkyl, phenyl, phenyl$C_{1-4}$alkyl or $C_{1-12}$alkylphenyl and $R_{22}$ is $C_{1-12}$alkyl or hydrogen;

each $R_1$ independently is —$CH_3$ or —$CH_2(C_{1-4}$alkyl) or both groups $R_1$ form a group —$(CH_2)_5$—;

each $R_2$ independently is —$CH_3$ or —$CH_2(C_{1-4}$alkyl) or both groups $R_2$ form a group —$(CH_2)_5$—;

$R_4$ is a direct bond or a bridging group and $R_5$ is hydrogen or $C_{1-4}$alkyl, or $R_4$ and $R_5$ together with the carbon atom to which they are attached form an isocyclic or heterocyclic bridging group;

$R_6$ is —$NH_2$, mono or di—$C_{1-4}$alkylamino, $C_{1-2}$alkylcarbonylamino, benzoylamino, hydrogen, OH or —CO—$C_{1-4}$alkyl or —CO—$C_{1-4}$alkoxy and $R_7$ is hydrogen or $C_{1-4}$alkyl, or $R_6$ or $R_7$ together with the carbon atom to which they are attached form an isocyclic or heterocyclic ring;

$R_8$ is a direct bond or a bridging group;

D is a residue of a pigment; and n is an integer from 1 to 4 inclusive.

2. A composition according to claim 1, in which D is a pigment residue of the azo, perinone, perylene, quinophthalone, isoindolinone, dioxazine, acetoacetylamine, phthalocyanine or pyrrolo-pyrrole series.

3. A composition according to claim 1, in which D is D' where D' is a group of formula III to VIII when monovalent

   (III)

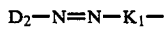   (IV)

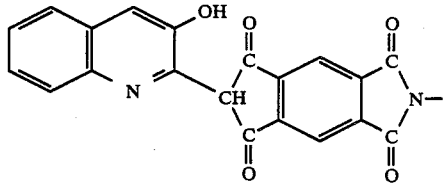   (V)

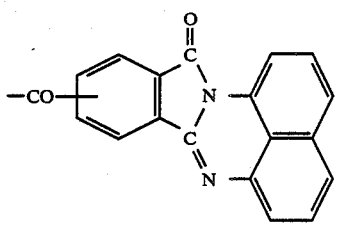   (VI)

CuPc—   (VII)

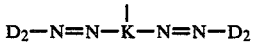   (VIII)

or D' is a group of formula IX to XV, when divalent

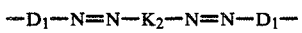   (IX)

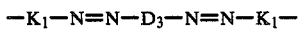   (X)

—CuPc—   (XI)

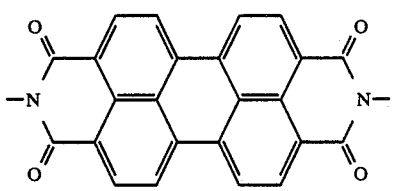   (XII)

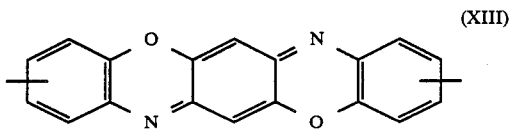   (XIII)

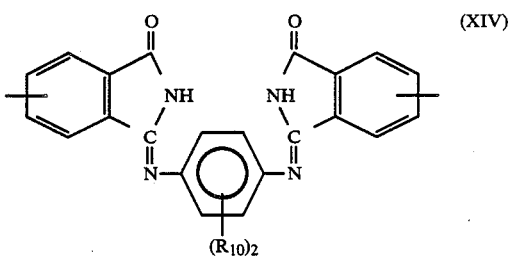   (XIV)

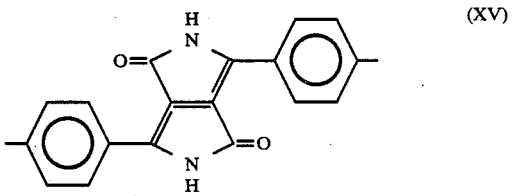   (XV)

or D' is a group of the formula XVI, when trivalent $$-CuPc\diagup_{\diagdown} \quad (XVI)$$

or D' is a group of the formula XVII, when tetravalent $$\diagdown_{\diagup}CuPc\diagup_{\diagdown} \quad (XVII)$$

in which $D_1$ is 1,3- or 1,4-phenylene, unsubstituted or mono or di-substituted by substituents selected from the group consisting of chloro, bromo, $C_{1-2}$alkyl, $C_{1-2}$alkoxy, carboxy or $C_{1-4}$alkoxycarbonyl; or 1,4, -1,5- or 1,8-anthraquinone, unsubstituted or mono or disubstituted by substituents selected from the group consisting of chloro, bromo, hydroxy, $C_{1-3}$alkoxy or acylamino;

$D_2$ is phenyl, unsubstituted or substituted by one to three substituents, selected by the group consisting of chloro (max. 2), bromo (max. 2), $C_{1-2}$alkoxy (max 2), $C_{1-4}$alkoxy carbonyl (max 2) and acylamino (max 1);

$D_3$ is a 4,4'-diphenylene group, unsubstituted or substituted by one to four substituents selected from chloro, bromo, $C_{1-2}$alkyl and $C_{1-2}$alkoxy or is a group of formula

[structure with two phenyl rings bearing $(R_{10})_2$ substituents connected by CO—NH]

K— is

[naphthalene with OH, connected via CO—NH to phenyl with $(R_{10})_2$ and NH—]

[triazine ring connected via NH to phenyl with $(R_{10})_2$, NH—CO to naphthalene with OH]

where the starred atoms are attached to the azo in a group of formula VIII $K_1$ is a group of any one of formula $K_{1a}$ to $K_{1f}$ $$H_3C-CO-\overset{*}{C}H-CO-NH-\underset{(R_{10})_2}{\bigcirc} \quad (K_{1a})$$

$$H_3CO-CO-\overset{*}{C}H-CO-NH-\text{naphthyl} \quad (K_{1b})$$

[naphthalene with OH and $*$] $\quad (K_{1c})$

[naphthalene with OH, $*$, CO—NH—phenyl—$(R_{10})_2$] $\quad (K_{1d})$ $$-\overset{*}{C}H-\underset{\underset{C_6H_5}{|}}{\overset{\diagup}{C}}=\overset{N}{\underset{N}{\diagdown}}-CO-R_{16}- \quad (K_{1e})$$

[pyridinone with $CH_3$, CN, OH, $*$] $\quad (K_{1f})$ where the starred atom is attached to the azo group of IV or X; and $R_{16}$ is —O— or —NH—;

$K_2$ is a group of any one of formula $K_{2a}$ to $K_{2c}$

[pyrazolone—CO—NH—phenyl—$(R_{10})_2$—NH—CO—pyrazolone with $C_6H_5$ groups] $\quad (K_{2a})$ $$H_3C-CO-\overset{|}{C}H-CO-NH-R_9-NH-CO-\overset{|}{C}H-CO-CH_3 \quad (K_{2b})$$

[bis-naphthol with CO—NH—$R_9$—NH—CO] $\quad (K_{2c})$ $K_3$ is a group of any one of formula $K_{3a}$ to $K_{3g}$

[naphthalene with OH, $CH_3$, CO—NH—phenyl—$(R_{10})_3$] $\quad (K_{3a})$

-continued

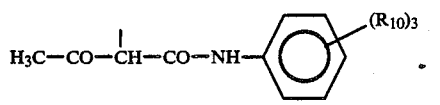 (K3b)

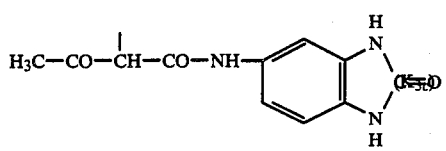 (K3c)

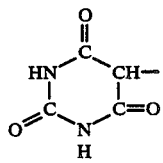 (K3d)

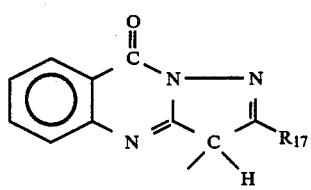 (K3e)

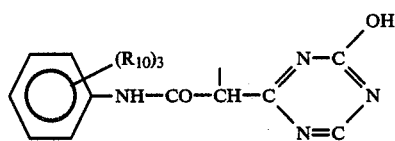 (K3f)

or

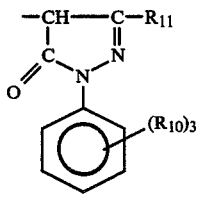 (K3g)

in which $R_{10}$ is hydrogen, chloro, bromo, $C_{1-3}$alkoxycarbonyl, $C_{1-2}$alkyl, $C_{1-2}$alkoxy or nitro;

$R_g$ is 1,4-phenylene, unsubstituted or substituted by one or two groups selected from chloro, bromo, methyl or $C_{1-2}$alkoxy; -4,4'-diphenylene; 1,4- or 1,5-naphthylene or a group of the formula

where A is —CH$_2$—, —NHCO—, —NHCONH—, —NH—CO—CO—NH— or

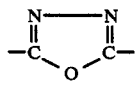

$R_{11}$ is methyl, —COOH or —COOC$_{1-4}$alkyl; and
$R_{17}$ is —OH, methyl or unsubstituted phenyl.

4. A composition according to claim 1 wherein the pigment is of the formula XX

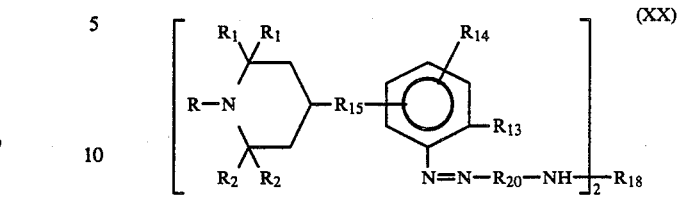 (XX)

in which R, $R_1$ and $R_2$ are as defined in claim 2; either both groups $R_{20}$ are of formula (e) or both groups $R_{20}$ are of formula (f)

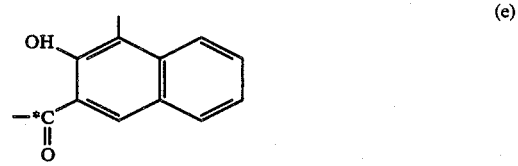 (e)

 (f)

where the starred atom is attached to the —NH group;

$R_{13}$ is hydrogen, chloro, bromo, methyl, ethyl, $C_{1-2}$alkoxy or $C_{1-4}$alkoxycarbonyl;

$R_{14}$ is hydrogen, chloro, bromo or methyl;

$R_{15}$ is —CO—NH*—, —CO—O*— or —SO$_2$N-H*—; the starred group being attached to the 2,2,6,6-tetraalkyl-piperidine group.

$R_{18}$ is 1,4-phenylene, unsubstituted or substituted by 1 or 2 groups selected from chloro, bromo, methyl, ethyl, methoxy and ethoxy; 4,4'-diphenylene, each phenylene group being unsubstituted or substituted by 1 or 2 groups selected from chloro, bromo, methyl, ethyl, methoxy and ethoxy; or unsubstituted 1,4- or 1,5-naphthalene.

5. A polymeric composition according to claim 1 in which the polymeric material is polypropylene or polyethylene.

6. A composition according to claim 1 wherein, when $R_4$ is a bridging group, it is *—NHCO—, *—NHSO$_2$-, *—NH—CO—O—, *—NH—COCH$_2$O—, *—NHCOCO—, —NHCOCONH—, *—NHCOCOO—, *—OCO—, *—OSO$_2$—, *—OCOCO—, —OCO—CO—O—, *—OCONH— or *—OCOCONH—, where the starred atom is attached to the piperidine ring;

when $R_4$ and $R_5$ together with the carbon atom to which they are attached form a heterocyclic or isocyclic ring, this ring is a group of formula (a) or (b)

 (a)

-continued

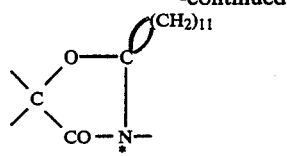
(b)

in which the starred atom is attached to D;
when $R_6$ and $R_7$ together with the carbon atom to which they are attached form a heterocyclic or isocyclic ring, this ring is a group of formula (c) or (d)

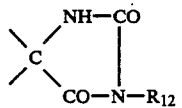
(c)

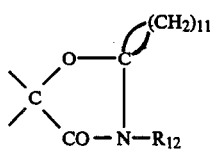
(d)

where $R_{12}$ is hydrogen, $C_{1-4}$alkyl or $C_{1-4}$alkoxycarbonyl-$C_{1-3}$alkyl; and
when $R_8$ is a bridging group, it is —CO—, —CH$_2$*CO—, —OCH$_2$*CO— or —SO$_2$—, where the starred atom is attached to the piperidine ring.

7. A composition according to claim 2 wherein,
when $R_4$ is a bridging group, it is *—NHCO—, *—NHSO$_2$—, *—NH—CO—O—, *—NH—COCH$_2$O—, *—NHCOCO—, —NHCOCONH—, *—NHCOCOO—, *—OCO—, *—OSO$_2$—, *—OCOCO—, —OCO—CO—O—, *—OCONH— or *—OCOCONH—, where the starred atom is attached to the piperidine ring.
when $R_4$ and $R_5$ together with the carbon atom to which they are attached form a heterocyclic or isocyclic ring, this ring is a group of formula (a) or (b)

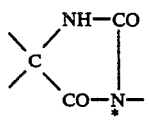
(a)

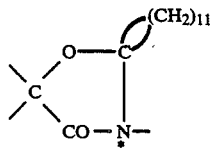
(b)

in which the starred atom is attached to D;
when $R_6$ and $R_7$ together with the carbon atom to which they are attached form a heterocyclic or isocyclic ring, this ring is a group of formula (c) or (d)

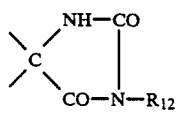
(c)

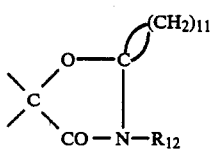
(d)

where $R_{12}$ is hydrogen, $C_{1-4}$alkyl or $C_{1-4}$alkoxycarbonyl-$C_{1-3}$alkyl; and
when $R_8$ is a bridging group, it is —CO—, —CH$_2$*CO—, —OCH$_2$*CO— or —SO$_2$—, where the starred atom is attached to the piperidine ring.

8. A composition according to claim 3 wherein,
when $R_4$ is a bridging group, it is *—NHCO—, *—NHSO$_2$—, *—NH—CO—O—, *—NH—COCH$_2$O—, *—NHCOCO—, —NHCOCONH—, *—NHCOCOO—, *—OCO—, *—OSO$_2$—, *—OCOCO—, —OCO—CO—O—, *—OCONH— or *—OCOCONH—, where the starred atom is attached to the piperidine ring.
when $R_4$ and $R_5$ together with the carbon atom to which they are attached form a heterocyclic or isocyclic ring, this ring is a group of formula (a) or (b)

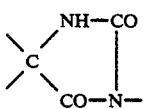
(a)

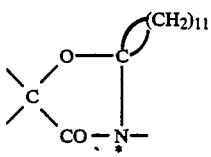
(b)

in which the starred atom is attached to D;
when $R_6$ and $R_7$ together with the carbon atom to which they are attached form a heterocyclic or isocyclic ring, this ring is a group of formula (c) or (d)

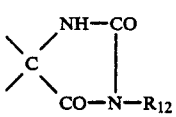
(c)

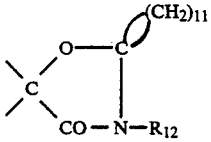
(d)

where $R_{12}$ is hydrogen, $C_{1-4}$alkyl or $C_{1-4}$alkoxycarbonyl-$C_{1-3}$alkyl; and
when $R_8$ is a bridging group, it is —CO—, —CH$_2$*CO—, —OCH$_2$*CO— or —SO$_2$—, where the starred atom is attached to the piperidine ring.

9. A composition according to claim 3 wherein, in any acylamino substituent on $D_1$ or $D_2$, the acyl group is —COC$_{1-4}$alkyl or —COC$_{1-4}$alkoxy.

10. A composition according to claim 4 wherein each $R_1$ and each $R_2$ is methyl and R is R' where R' is hydrogen, methyl, formyl, $C_{1-4}$alkylcarbonyl or —CO—CO—OC$_{1-4}$alkyl.

11. A composition according to claim 6 wherein
R is R' where R' is hydrogen, methyl, formyl, $C_{1-4}$alkylcarbonyl or —CO—CO—OC$_{1-4}$alkyl; each $R_1$ and $R_2$ is methyl;
$R_4$ is R'$_4$ and $R_5$ is R'$_5$ where either R'$_4$ is a direct bond, —NH—CO— or —NH—CO—CH$_2$—O— and R'$_5$ is hydrogen or R'$_4$ and R'$_5$ together with the carbon atom to which they are attached form a group of formula (a) or (b);
$R_6$ is R'$_6$ and $R_7$ is R'$_7$ where either R'$_6$ is —NH$_2$, mono- or di- $C_{1-4}$alkylamino, $C_{1-2}$alkylcarbonylamino or benzoylamino and R'$_7$ is hydrogen or R'$_6$ and R'$_7$ together with the carbon atom to which they are attached form a group of formula (c) or (d); and
$R_8$ is R'$_8$ where R'$_8$ is a direct bond or —CO—, —CH$_2$CO—, —OCH$_2$CO— or —SO$_2$—.

12. A composition according to claim 7 wherein,
R is R' where R' is hydrogen, methyl, formyl, $C_{1-4}$ alkylcarbonyl or —CO—CO—OC$_{1-4}$alkyl; each $R_1$ and $R_2$ is methyl;
$R_4$ is R'$_4$ and $R_5$ is R'$_5$ where either R'$_4$ is a direct bond, —NH—CO— or —NH—CO—CH$_2$—O— and R'$_5$ is hydrogen or R'$_4$ and R'$_5$ together with the carbon atom to which they are attached form a group of formula (a) or (b);
$R_6$ is R'$_6$ and $R_7$ is R'$_7$ where either R'$_6$ is —NH$_2$, mono- or di- $C_{1-4}$alkylamino, $C_{1-2}$alkylcarbonylamino or benzoylamino and R'$_7$ is hydrogen or R'$_6$ and R'$_7$ together with the carbon atom to which they are attached form a group of formula (c) or (d); and
$R_8$ is R'$_8$ is a direct bond or —CO—, —CH$_2$CO—, —OCH$_2$CO— or —SO$_2$—.

13. A composition according to claim 8 wherein,
R is R' where R' is hydrogen, methyl, formyl, $C_{1-4}$ alkylcarbonyl or —CO—CO—OC$_{1-4}$alkyl; each $R_1$ and $R_2$ is methyl;
$R_4$ is R'$_4$ and $R_5$ is R'$_5$ where either R'$_4$ is a direct bond, —NH—CO— or —NH—CO—CH$_2$—O— and R'$_5$ is hydrogen or R'$_4$ and R'$_5$ together with the carbon atom to which they are attached form a group of formula (a) or (b);
$R_6$ is R'$_6$ and $R_7$ is R'$_7$ where either R'$_6$ is —NH$_2$, mono- or di- $C_{1-4}$alkylamino, $C_{1-2}$alkylcarbonylamino or benzoylamino and R'$_7$ is hydrogen or R'$_6$ and R'$_7$ together with the carbon atom to which they are attached form a group of formula (c) or (d); and
$R_8$ is R'$_8$ where R'$_8$ is a direct bond or —CO—, —CH$_2$CO—, —OCH$_2$CO— or —SO$_2$—.

14. A composition according to claim 9 wherein,
R is R' where R' is hydrogen, methyl, formyl, $C_{1-4}$ alkylcarbonyl or —CO—CO—OC$_{1-4}$alkyl; each $R_1$ and $R_2$ is methyl;
$R_4$ is R'$_4$ and $R_5$ is R'$_5$ where either R'$_4$ is a direct bond, —NH—CO— or —NH—CO—CH$_2$—O— and R'$_5$ is hydrogen or R'$_4$ and R'$_5$ together with the carbon atom to which they are attached form a group of formula (a) or (b);
$R_6$ is R'$_6$ and $R_7$ is R'$_7$ where either R'$_6$ is —NH$_2$, mono- or di- $C_{1-4}$alkylamino, $C_{1-2}$alkylcarbonylamino or benzoylamino and R'$_7$ is hydrogen or R'$_6$ and R'$_7$ together with the carbon atom to which they are attached form a group of formula (c) or (d); and
$R_8$ is R'$_8$ where R'$_8$ is a direct bond or —CO—, —CH$_2$CO—, —OCH$_2$CO— or —SO$_2$—.

15. A composition according to claim 13 wherein $R_{10}$ is R'$_{10}$ where R'$_{10}$ is hydrogen, methyl, chloro, bromo, $C_{1-2}$alkoxy (max. 1 on a phenyl ring) or $C_{1-3}$alkoxycarbonyl (max. 1 on a phenyl ring).

16. A composition according to claim 14 wherein $R_{10}$ is R'$_{10}$ where R'$_{10}$ is hydrogen, methyl, chloro, bromo, $C_{1-2}$alkoxy (max. 1 on a phenyl ring) or $C_{1-3}$alkoxycarbonyl (max. 1 on a phenyl ring).

17. A composition according to claim 3 wherein the pigment is of the formula

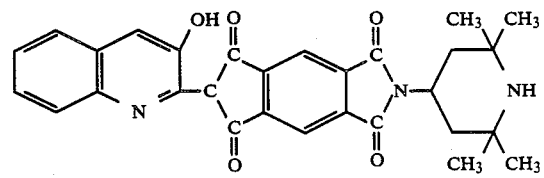

18. A composition according to claim 4 wherein the pigment is of the formula

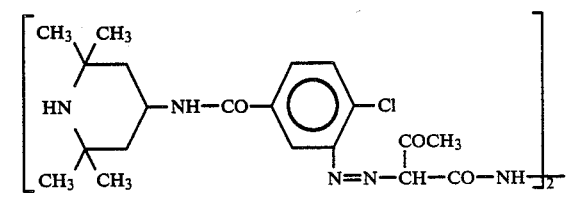

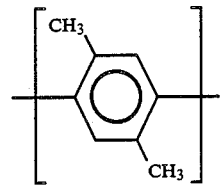

19. A composition according to claim 4 wherein the pigment is of the formula

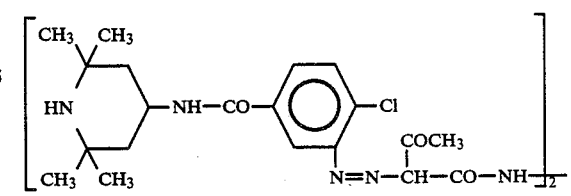

20. A composition according to claim 4 wherein the pigment is of the formula

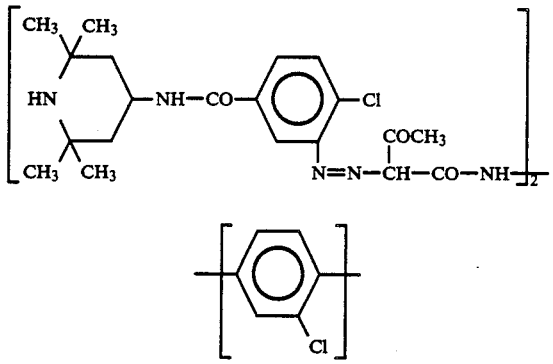

21. A composition according to claim 4 wherein $R_{14}$, when it is other than hydrogen, is para to $R_{13}$; and $R_{15}$ is attached to the phenyl ring para to $R_{13}$ when $R_{14}$ is hydrogen and para to the azo moiety when $R_{14}$ is other than hydrogen.

22. A composition according to claim 4 wherein
$R_{13}$ is chloro, methoxy or $C_{1-2}$alkoxycarbonyl,
$R_{14}$ is hydrogen or chloro, and
$R_{15}$ is —CO—NH— or —SO$_2$NH—.

23. A composition according to claim 21 wherein
$R_{13}$ is chloro, methoxy or $C_{1-2}$alkoxycarbonyl,
$R_{14}$ is hydrogen or chloro, and
$R_{15}$ is —CO—NH— or —SO$_2$NH—.

24. A composition according to claim 1 where the polymeric material is polyethylene, polypropylene, polystyrene, polyvinylchloride, natural rubber or synthetic leather.

25. A composition according to claim 3 where the polymeric material is polyethylene, polypropylene, polystyrene, polyvinylchloride, natural rubber or synthetic leather.

26. A composition according to claim 4 where the polymeric material is polyethylene, polypropylene, polystyrene, polyvinylchloride, natural rubber or synthetic leather.

27. A composition according to claim 8 where the polymeric material is polyethylene, polypropylene, polystyrene, polyvinylchloride, natural rubber or synthetic leather.

28. A composition according to claim 9 where the polymeric material is polyethylene, polypropylene, polystyrene, polyvinylchloride, natural rubber or synthetic leather.

29. A composition according to claim 10 where the polymeric material is polyethylene, polypropylene, polystyrene, polyvinylchloride, natural rubber or synthetic leather.

30. A composition according to claim 14 where the polymeric material is polyethylene, polypropylene, polystyrene, polyvinylchloride natural rubber or synthetic leather.

31. A composition according to claim 1 wherein the pigment is present in an amount sufficient to stabilize the polymeric material against the effects of U.V. light.

32. A composition according to claim 4 wherein the pigment is present in an amount sufficient to stabilize the polymeric material against the effects of U.V. light.

33. A composition according to claim 26 wherein the pigment is present in an amount sufficient to stabilize the polymeric material against the effects of U.V. light.

34. A composition according to claim 30 wherein the pigment is present in an amount sufficient to stabilize the polymeric material against the effects of U.V. light.

* * * * *